United States Patent
Koehler et al.

(10) Patent No.: US 8,567,954 B2
(45) Date of Patent: Oct. 29, 2013

(54) 3D DISPLAY SYSTEM WITH REAR PROJECTION SCREENS FORMED OF WATER MIST OR SPRAY

(75) Inventors: Erik M. Koehler, Newport Beach, CA (US); Justin A. Sykes, Upland, CA (US)

(73) Assignee: Disney Enterprises, Inc., Burbank, CA (US)

( * ) Notice: Subject to any disclaimer, the term of this patent is extended or adjusted under 35 U.S.C. 154(b) by 288 days.

(21) Appl. No.: 13/173,066

(22) Filed: Jun. 30, 2011

(65) Prior Publication Data

US 2013/0003020 A1 Jan. 3, 2013

(51) Int. Cl.
*G03B 21/00* (2006.01)
*G03B 21/26* (2006.01)
*G03B 21/56* (2006.01)
*H04N 13/04* (2006.01)

(52) U.S. Cl.
USPC ........ 353/7; 353/30; 353/71; 353/20; 353/10; 239/18; 359/460; 349/15; 348/744; 348/51

(58) Field of Classification Search
USPC ............... 353/7, 30, 71, 122, 20, 10; 239/18; 359/443, 460; 349/15; 348/744, 42, 51
See application file for complete search history.

(56) References Cited

U.S. PATENT DOCUMENTS

| | | | | |
|---|---|---|---|---|
| 620,592 | A * | 3/1899 | Just | 353/122 |
| 5,368,228 | A * | 11/1994 | Adamson et al. | 239/18 |
| 5,445,322 | A * | 8/1995 | Formhals et al. | 239/18 |
| 6,857,746 | B2 * | 2/2005 | Dyner | 353/28 |
| 2010/0066813 | A1 * | 3/2010 | Jorke | 348/46 |
| 2011/0285964 | A1 * | 11/2011 | Reichow | 353/10 |

* cited by examiner

*Primary Examiner* — Tony Ko
*Assistant Examiner* — Magda Cruz
(74) *Attorney, Agent, or Firm* — Marsh Fischmann & Breyfogle, LLP; Kent A. Lembke

(57) ABSTRACT

A 3D display system using a planar sheet of mist or water droplets as a rear projection screen. The system includes a screen generation assembly with a nozzle configured to convert supply water into a screen of water droplets. The screen is substantially planar and has a front surface facing a viewing area and an opposite rear surface. The display system includes a projection assembly projecting 3D content onto the rear surface. The projection assembly includes a first projector projecting left eye images and a second projector projecting right eye images. The 3D content may be provided using polarization or other 3D technology. For example, the first projector includes a first interference filter and the second projector includes a second interference filter differing from the first interference filter, whereby the left and right eye images are presented concurrently on the rear surface with differing bands of the visible color spectrum.

24 Claims, 4 Drawing Sheets

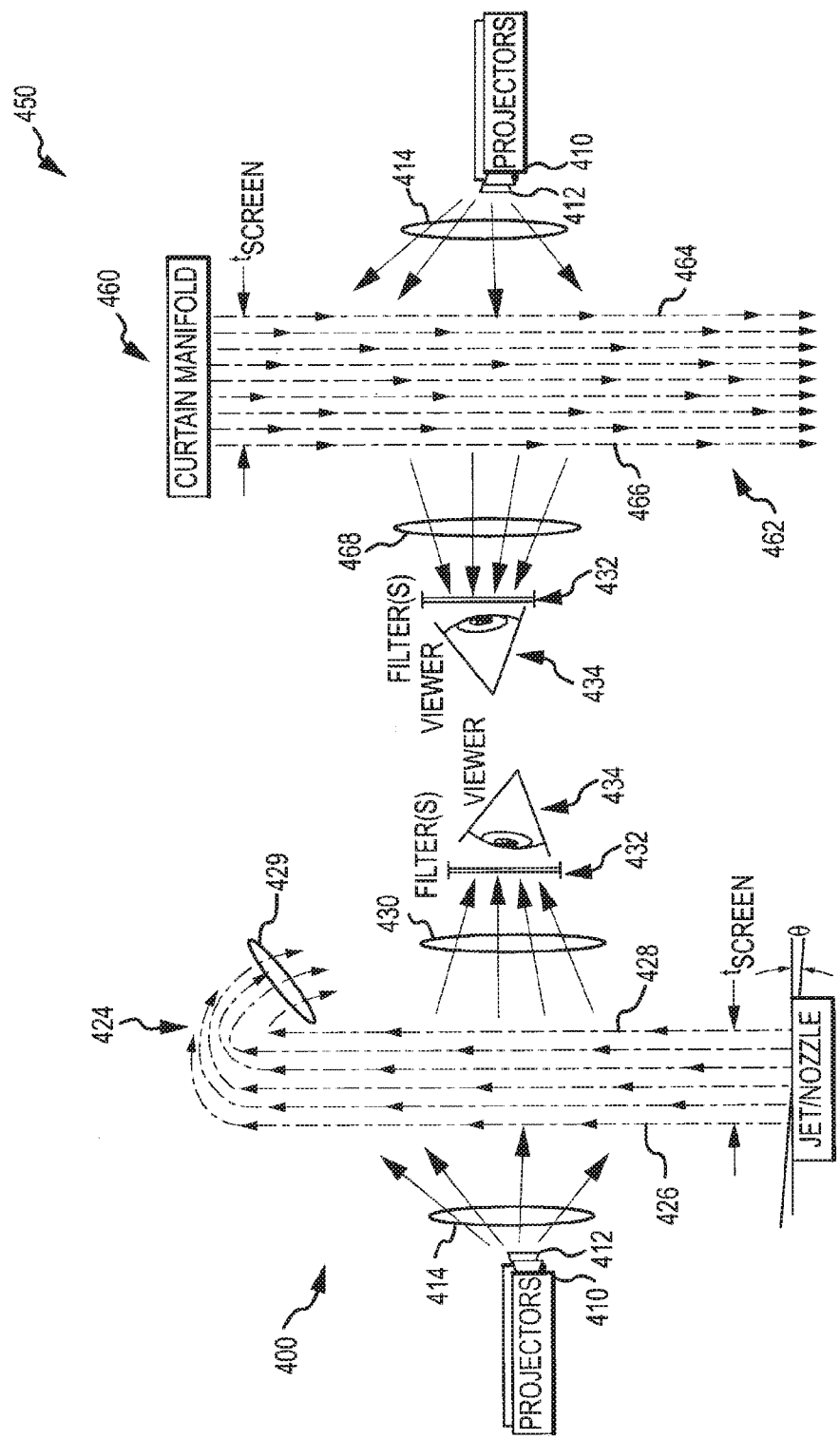

3D DISPLAY SYSTEM WITH REAR PROJECTION SCREENS FORMED OF WATER MIST OR SPRAY

BACKGROUND

1. Field of the Description

The present description relates, in general, to visual display and projection systems, and, more particularly, to a method and system for providing three dimensional (3D) still and video images in an indoor entertainment setting or in an outdoor entertainment setting such as an amusement park, an athletic stadium, a street mall, or the like with a potentially large audience.

2. Relevant Background

There is a growing demand for providing entertainment in outdoor settings such as in large city parks, amusement or theme parks, sporting events, outdoor musical concerts, or other settings in which large numbers of people gather. For example, it is well known to provide laser or light-based projections as part of outdoor music concerts. In other cases, it is popular to provide a fireworks show to entertain a crowd at a park setting or during or after a baseball, soccer, or football game.

In many cases, it is desirable to create a show that is so unique and exciting that people visit a facility or venue in large part or solely for the outdoor show, e.g., to see the fountain effect at a theme park or casino. In such cases, water fountains, jets, and pulses may be synchronized to move and interact with each other and with a musical score. More recently, water screens have been used to present still and video images to audiences such as at trade shows and theme parks. For example, a conventional projector may be used to display a standard two-dimensional video or still image on a sheet of water. Unfortunately, high quality displays often cannot be created as such water-based displays often require tightly controlled environments with little or no wind, very low ambient light or a dark setting, and high brightness projectors.

SUMMARY

The inventors understood that it would be highly desirable to provide a large three dimensional (3D) display to entertain audiences such as those at a theme park, and they further understood that it would be very useful if such a 3D display could be provided in outdoor venues. The inventors also knew that providing a 3D image often significantly reduces the brightness of the display, and conventional water displays already often appeared less bright and clear than imagery projected on other surfaces such as a movie theater projection screen. Further, silver screens are typically used for 3D projection screens so as to maintain polarization of two projected images (left and right eye images) and allow proper viewing with an audience wearing linearly polarized glasses. Use of special silver screens also taught against trying to project 3D onto water surfaces.

Significantly, though, the inventors recognized or believed that if a water screen were provided in the form of numerous suspended water particles (rather than a solid sheet of water) this water mist screen would provide a unique and useful rear projection (RP) screen for displaying 3D content, which could then be viewed by an audience wearing 3D glasses (or otherwise provided with left/right eye image filters). With this in mind, the inventors created prototype 3D display systems that included a water screen generator (such as a plurality of screen nozzles) that created a mist or spray of water droplets to produce a surface of fine water droplets or particles that in combination provide an RP screen.

The 3D display system also included a media server providing 3D content and a projector system (e.g., a 3D or stereo projection system) with two projectors that provided or projected left and right eye content onto the back or rear surface of the water screen. The audience is provided 3D filters (e.g., glasses) to view the images displayed upon the water screen. The resulting 3D display had surprising clarity and was visible to viewers over a wide viewing angle such that viewers did not have to be positioned directly in front of the center of the screen.

While numerous projectors may be used, the inventors further understood that it is desirable in many applications to use a projector that would be more likely to cause a larger portion of the color spectrum to reach the viewers' eyes. To this end, a projector may be used that achieves left eye-right eye parallax without having to use blanking or polarization. This may be important on water screens as light diffraction caused by the turbulence of the moving water may drastically reduce the actual amount of light perceived by the viewers. For example, a 3D technology, such as Dolby 3D provided by Infitec GmbH or the like, that uses a technique for channel separation in stereo projection based on interference filters may be used in the 3D display system to increase the overall saturation of color and perceived light on the water screen surfaces.

More particularly, a 3D display system is provided that effectively uses water to provide a projection surface (e.g., water forms or provides an RP screen). The system includes a projection screen generation assembly. This assembly includes a nozzle or orifice configured to convert a volume of supply water into a screen of water droplets, and the screen is substantially planar and has a front surface facing a viewing area and an opposite rear surface. The display system further includes a projection assembly operating at least partially concurrently with the projection screen generation assembly to project 3D content onto the rear surface.

In some embodiments of the display system, the projection assembly includes a first projector projecting a stream of left eye images and a second projector projecting a stream of right eye images. For example, the projected 3D content comprises the left and right eye images that may correspond to 3D movie or the like. The 3D content may be provided using linear or circular polarization or another 3D technology. For example, in some preferred embodiments, the first projector includes a first interference filter and the second projector includes a second interference filter differing from the first interference filter, whereby the left and right eye images are presented concurrently on the rear surface with differing bands of the visible color spectrum. When interference filtering is utilized as the 3D projecting technology, the display system may include 3D glasses provided to viewers in the viewing area. Each of the 3D glasses includes a left lens with an interference filter configured to pass images filtered by the first interference filter and a right lens with an interference filter configured to pass images filtered by the second interference filter. Of course, other polarization systems may be utilized in a display system, and these other existing or yet-to-be-developed systems are considered to be within the breadth of this description and claims of this application.

In some implementations, the first and second projectors are high brightness projectors that project the left and right eye images at brightness levels of at least about 10,000 lumens. In some cases, the nozzle comprises a screen jet positioned to spray the water droplets upward to form a substantially planar sheet of water that is substantially vertical.

The supply water may be at a pressure of at least 50 psi, and the planar sheet of water may have a thickness of at least about 3 inches as measured at a base of the planar sheet proximate to the nozzle. Further, the mist screen may effectively provide a projection surface when at least about 50 percent of the water droplets have outer dimensions of less than about 1 millimeter.

In other cases, though, the nozzle may include an elongated distribution manifold positioned a height above the ground of at least about 10 feet, and, in such cases, the distribution manifold may include a plurality of holes or orifices on a ground-facing surface to drop the water droplets toward the ground to form the screen. In these drop-style curtains or screens, the screen may have a thickness of at least about 1 inch as measured proximate to the ground-facing surface and the droplets may be larger such as up to 1000 to 3000 microns or the like.

BRIEF DESCRIPTION OF THE DRAWINGS

FIGS. 4A and 4B are side views illustrating schematically 3D display systems in which the RP screen is formed, respectively, from the bottom and top edge with a screen nozzle/jet and a drop-style curtain manifold.

DETAILED DESCRIPTION

Briefly, the present invention is directed to methods and systems for creating 3D displays utilizing projection screens formed of water. More specifically, rear projection (RP) screens are formed of a mass of water droplets that may be sprayed upward from a pressurized screen-forming nozzle (or mist generator) or dropped downward from an outlet nozzle or manifold of a water curtain-forming assembly. An exemplary display system will utilize a 3D projection and viewing technology, and 3D content is projected upon a rear or back surface of the water-based RP screen for viewing by an audience or viewers wearing 3D glasses/filters suited to the 3D content. For example, a 3D projection and viewing technology that is well suited for projecting on a mist screen/curtain is interference filter technology (or "Infitec"), and the 3D display system may use interference filters (e.g., dichromatic filters) in the viewer's glasses and in the projectors to deliver right and left eye images/content to the right and left eye of viewers to create a visually appealing 3D display with the water RP screen.

Figure 1:
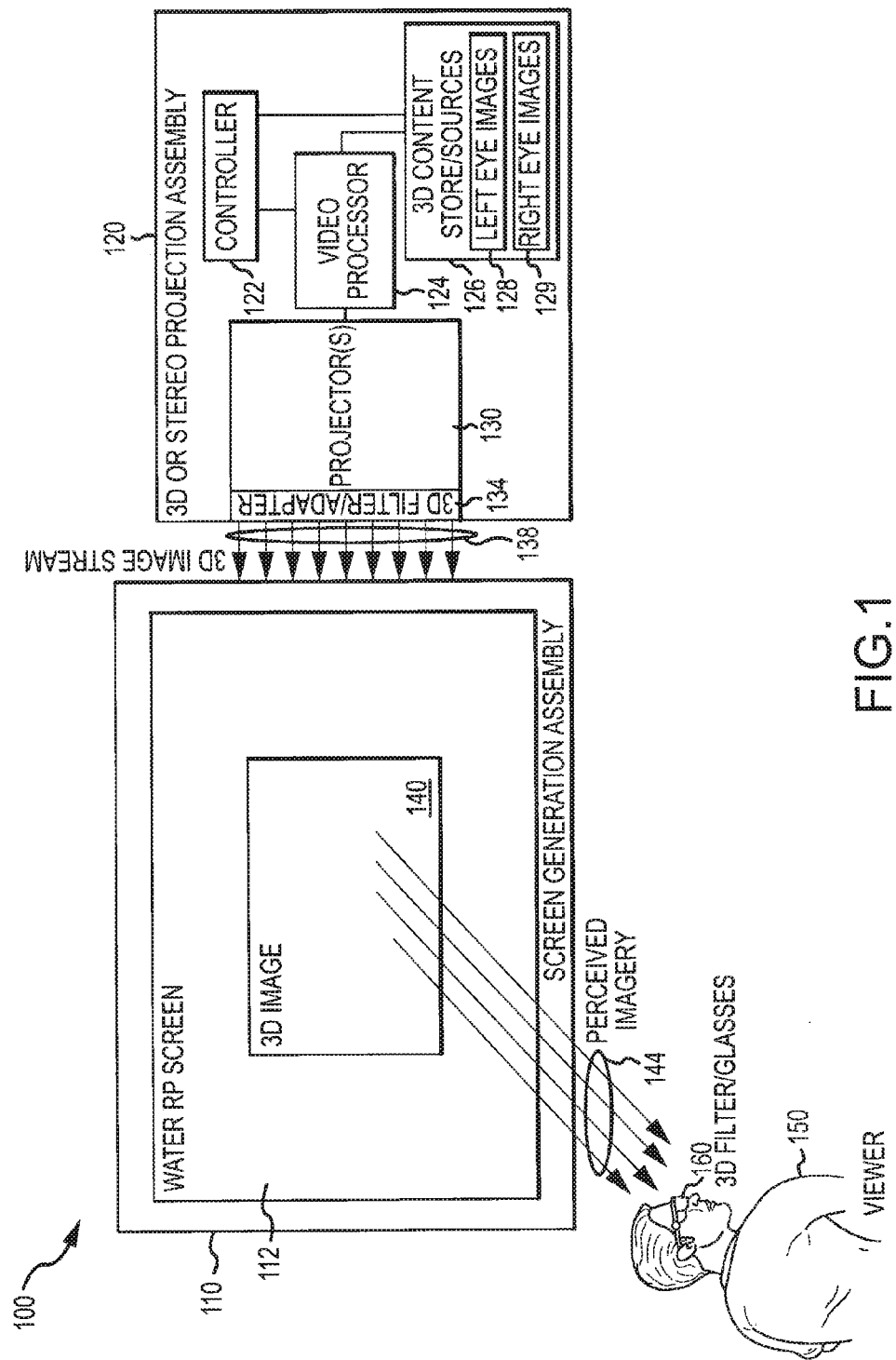
FIG. 1 is a functional block or schematic illustration of a 3D display system that operates to project still or video images onto a rear projection (RP) screen that is selectively formed to receive the projected images from a stereo projection assembly, e.g., that is formed of one or more flowing curtains or sheets of water droplets/particles or mist output from a screen generation assembly a water curtain (formed from the top or above) or a sprayed water screen (formed from below), with the RP screen shown from the front view or from the view seen by a viewer or a member of an audience.

FIG. 1 illustrates in functional block (or schematic) form a 3D display system 100 in use to display a 3D image 144 to a viewer 150 (or an audience). To this end, the 3D display system 100 includes a projection screen generation assembly 110. The assembly 110 may be operated selectively via a controller (not shown) that may operate, for example, a water supply valve to deliver a supply of water to one or more outlet nozzles/jets (for upward dispersed or sprayed mist screens) or droplet manifolds (for downward dispersed or released water curtains).

When operated, the screen generation assembly 110 produces a rear projection (RP) screen formed of water droplets. For example, the assembly 110 may provide a mist screen 112 made up of a mass of fine droplets of water. In some cases, the screen generation assembly 110 may use a supply of pressurized water that is fed to a mist generator (e.g., a nozzle, jet, or orifice) configured to convert pressurized water into a high volume of suspended water particles or fine droplets. This mass may have a thickness from between 1 to 3 inches up to 12 inches or more (as measured at the outlet of the nozzle, orifice, or the like with some useful screen-forming jets or nozzles being 10 to 12 inches in diameter). The water droplets or particles provide a surface that can be projected upon with 3D content.

The 3D display system 100 further includes a 3D or stereo projection assembly 120 that operates (e.g., concurrently with screen generation assembly) to project or output 3D content as shown at 138 with a stream(s) of 3D images directed toward or focused upon the rear or back surface of the water RP screen 112. The water droplets or fine particles of water in the screen 112 act to display a 3D image 140. The 3D display system 100 further includes filters or 3D glasses 160 that are worn or used by the viewer 150 to perceive the 3D image 140 on the water RP screen 112. The 3D filters or glasses with such filters 160 are adapted to send right eye images in the 3D image 140 to the viewer's right eye and left eye images in the 3D image 140 to the viewer's left eye.

The projection assembly 120 includes a controller (e.g., a computer or similar electronic device with a processor, an operating system, memory, 110 devices, and the like) 122. The controller 122 is selectively operable by software running in the assembly 120 or by an operator to use a video processor 124 to selectively feed or stream left and right eye images 128, 129 from a 3D content source/store 126 (e.g., digital video or still content in memory of the assembly 120 or received over wired/wireless connections from another media server/source).

The video processor 124 provides this content to one or more projectors 130, and the projectors 130 each include a 3D filter or adapter to provide the 3D image stream 138 using a particular 3D projection/delivery technology (such interference filter technology, linear polarization, circular polarization, spinning wheel techniques, or another existing or to-be-developed 3D projection technology). The 3D filters/glasses 160, as discussed above, are matched to the technology used to provide the 3D content in store 126 and to create the 3D image stream 138 by 3D filter/adapter 134 such that the viewer 150 perceives 144 the 3D image 140 on water RP screen 112. Again, other types of 3D projection technology may be utilized with the illustrated system just providing one example. Similarly, one or more projectors 130 may be utilized. For example, a single projector 130 may be used to provide the 3D image stream 138, e.g., a rotating filter such as a 120 kHz or similar rotating filter projector. Other arrangements for the projection assembly 120 may include a projector with high lumen output that utilizes any type of content generation or delivery. Similarly, the water screen or curtain may utilize nearly any type of technology to provide the water screen or curtain.

Figure 2:
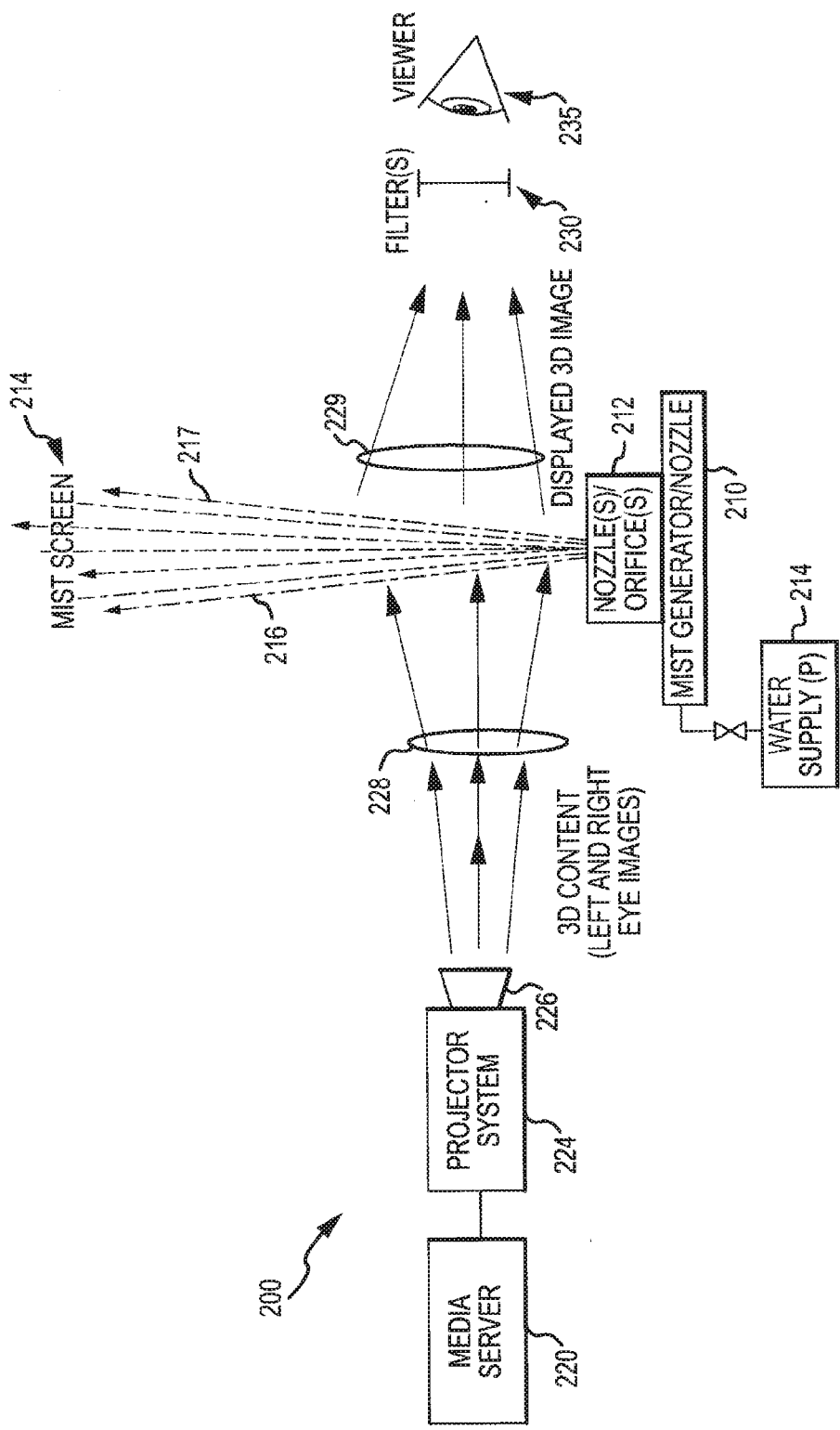
FIG. 2 is a side view showing another 3D display system similar to that of FIG. 1 showing a projector system projecting 3D content upon a rear surface of a water mist (or spray or droplet) screen to allow a 3D image to be viewed by a viewer via proper optical filters (e.g., 3D glasses configured to filter left/right eye images based on the projection filter or stereo technology used by the projector(s))

FIG. 2 illustrates a side view of another 3D display system 200 that uses a screen 214 of water droplets (e.g., a mist or spray screen) to provide or display 229 a 3D image to a viewer 235 via filters/glasses 230. The system 200 includes a water supply 214 that may provide water at relatively high pressures via a control valve to a mist or screen generator 210. The screen generator 210 includes one or more outlet nozzles or orifices 212 that are designed to eject the pressurized water upward (in this example) as water droplets or as finely dispersed mist to form the mist screen 214. Typically, the mist screen 214 is generally orthogonal to horizontal but may be angled (as discussed below) to achieve a particular effect and/or to limit pollution caused by falling water (e.g., to maintain a higher quality rear surface 216 for receiving 3D content 228 the nozzle/orifice 212 may be angled toward the viewer 235 such as at an angle of 1 to 5 degrees or more).

The 3D display system 200 further includes a media server 220 that provides digital content to a projector system 224. For example, the media server 220 may provide left and right eye images for a still image or for a video or movie. The projector 224 includes a filter/adapter 226 to project 3D content (e.g., the left and right eye images) 228 onto the rear or back surface 216 of the mist screen 214 (e.g., on the surface opposite the front surface 217 facing and/or proximate to the viewer 235). This causes or allows a displayed 3D image 229 to be viewed via front surface 217 by the viewer 235, who is wearing or using the filter(s) or glasses 230 to cause the left eye images to be seen by the left eye and the right eye images to be seen by the right eye. Again, the 3D projection and viewing technologies provided by the filter/adapter 226 and the filters/3D glasses 230 would be matched to allow the viewer 235 to properly perceive the projected 3D content 228 using the mist screen 214.

At this point in the description, it may be useful to discuss components or devices that may be used to implement the display systems 100, 200 in more detail and to provide one implementation used by the inventors to test their water-based 3D projection concepts. Turning first to the tested implementation or prototype, a 3D display system was operated that utilized a large-scale screen nozzle to generate a water screen of useful quality for providing a projection surface or RP screen.

More specifically, a water screen jet was used to create a mist or water droplet screen for rear projection, and the prototype used a water screen jet manufactured by PEM Fountain Company, Ontario, Canada to create the mist screen. In one embodiment, the PEM 1854/08, 6-inch Water Screen Jet was used with inlet water pressures ranging from about 50 to 250 PSI. This produced screens with heights from about 10 to 100 feet and widths of about three times these height values. The jet/nozzle (e.g., a stainless steel screen jet) has a 12-inch outer diameter and was configured with numerous, very small diameter holes so as to employ laminar adhesion distribution of the ejected spray or mist (e.g., to convert the high pressure water supply to a mass of dispersed fine droplets), and the ejected spray had an arc that varied with nozzle pressure (e.g., 175 to 182 degrees). In some cases, the supply inlet may include a pump to provide the high pressure water to the jet/outlet nozzle and a flow straightener (e.g., a PEM 21060, 6-inch flow straightener).

The 3D technology utilized for projection and filtering with the 3D glasses/viewer's filters was an interference filter technology. With interference filter technology or "Infitec," special interference filters in the form of dichromatic filters are provided in the viewer's glasses as well as in the projector. The filters divide the visible color spectrum into six narrow bands (two in the red region, two in the green region, and two in the blue region, which may be called R1, R2, G1, G2, B1, and B2). The R1, G1, and B1 bands are used for one eye image (such as the left eye) and the R2, G2, and B2 bands are used for the other eye (such as the right eye). The human eye is largely insensitive to such fine spectral differences such that the interference filter technique for 3D projection is able to generate full-color 3D images with only slight color differences between the two eyes. Sometimes this technique is described as a "super-anaglyph" because it is an advanced form of spectral multiplexing, which is a key to conventional anaglyph techniques for providing 3D displays.

Such interference filter techniques are used by Dolby in Dolby 3D theaters. In the tested implementation of the 3D display system, the inventors used the Dolby Infitec 3D process in conjunction with the water screen described above. Hence, the 3D adapter/filter on the projectors may be thought of as an interference filter or Infitec adapter with the 3D glasses having similar filters to direct the appropriate images to the right and left eyes. In some cases, dichroic filters may be used such as glass dichroic filters available from Dolby and/or Infitec GmbH or others in the 3D projection/viewing industry. In the test system, the projectors and video processor were products distributed by Christie Digital Systems USA, Inc., such as a projector from the LX or LW series or SXGA s+20k series (e.g., Roadster) and one of the Vista Spyder, Spyder X20, or Vista URS video processors (for use in video manipulation of the signal flow) but nearly any projector may be used to project the 3D content. The 3D display system was successfully operated at night (e.g., with low or little ambient lighting) to project 3D content on a rear surface of the water screen that allowed an audience to view a clear and bright stereoscopic image through 3D glasses (i.e., INFITEC® premium glasses). Note, further, that the display systems may be useful for outdoor settings but are also useful in indoor venues and applications.

The inventors believe an advantage of using these particular 3D technologies is that interference filtering (as provided with the Dolby and/or Infitec GmbH system/devices) does not use blanking or polarization to achieve left eye-fight eye parallax. It allows nearly the whole color spectrum to reach the viewers' eyes. This effect is important and desirable with use of water or mist screens as light diffraction caused by turbulence of the water, for example, can drastically reduce the actual perceived light amount or levels. Using interference filtering as part of the 3D projection/viewing components of the 3D display system significantly increases the overall saturation of color and brightness of the viewed 3D image, which allows use of the concepts taught herein.

In other words, the inventors have discovered that, despite industry teaching or knowledge suggesting 3D displays preferably use high quality screens such as silver screens, 3D projection can be effectively done using water droplets in a sprayed (or in "dropped" or falling water) screen or curtain to provide a RP screen. To this end, the supply water is generally output from a nozzle/orifice/manifold with turbulence to create a mist with a particular thickness and density (or amount droplets are disperses or amount of mixed air in the water screen/curtain). A thicker screen typically is preferred to create a brighter 3D display by providing more particles or droplets providing the rear or projection surface of the screen/curtain. Further, it is generally preferred that the projectors are high brightness projectors to achieve a better effect as 3D projection techniques generally reduce brightness of images, and lower light conditions are generally better for viewing the displayed image (e.g., the 3D display systems may be more useful for nighttime use in outdoor applications).

With the above test or specific implementation in mind, it may be useful now to discuss more generally several of the components of a 3D display system adapted for projecting on a water RP screen. The 3D technology to project 3D content and/or view the displayed 3D images may be the interference filter-based technology discussed above in many embodiments but other techniques may be useful in some cases. For example, a single projector may be used in some cases with a spinning wheel adapter synched to a projectors output stream to alternate projection of right and left eye images, but many embodiments will utilize two projectors to have dedicated projectors concurrently projecting left and right eye images as 3D content.

In some cases, the 3D viewer technology may be active such as liquid crystal shutter glasses that are synchronized with the projected images on the RP screen (mist screen/curtain). In some embodiments, polarization techniques are used and the 3D glasses/filters may be linear or other polarized glasses. In these embodiments, a 3D video or motion picture is provided by using two projectors to project two images onto the rear surface of the mist screen/curtain through orthogonal polarizing filters (but there may be some loss of polarization without a silver screen). The two projectors may receiver 3D content from a computer with a dual-head graphics card, a media server, and/or a video processor (as described above). The viewer wears 3D glasses with a pair of orthogonal polarizing filters each adapted to only pass light that is similarly polarized and block the orthogonal light such that each eye only sees one of the two concurrently displayed images. In other cases, the viewer may be provided circularly polarized glasses with lenses providing circular polarizers mounted in reverse to have opposite handedness. Two projectors may be included in the 3D display system to project two superimposed images onto the same portion of the rear surface of a water screen/curtain. The projectors project through circular polarizing filters of opposite handedness such that light that is left-circularly polarized is extinguished by the right-handed analyzer/lens and vice versa (e.g., the 3D technology may be similar to that utilized in RealD cinemas including the RealD or RealD-type 3D glasses).

In general, the 3D display systems described herein are adapted to project 3D content upon a RP screen formed of a screen, sheet, or curtain of water. This water screen may be thought of as a mist screen as it is made up of a mass of fine droplets of water in the air in a viewing area of an audience or viewers wearing 3D glasses or using 3D technology filters. Breaking or dispersing water into a cloud or mass or very small droplets greatly increases the surface area available for receiving and displaying projected 3D content. Thus, the finer the particles the higher quality the resulting 3D displayed image (as long as density and/or thickness are also adequate). It is difficult or impossible to create a screen with uniform diameter water particles and a fairly large range may be used to practice the invention. In some cases, though, the water mist nozzle (or free-falling/overhead distribution piping or manifold) is chosen to provide a large percentage (such as 50 percent or more) of its droplets at sizes (e.g., diameters) of less than about 3 millimeters (3000 microns) with nozzles providing larger percentages of droplets at less than about 1 millimeter being more desirable (e.g., 300 to 1000 micron mist nozzles may be useful).

The mist screens may be formed generally in two ways: spraying the drops or droplets into the air or dropping the water from an elevated mist screen or water curtain generator. In the first case, the mist screen may take on a fan or peacock tail shape and be implemented using the PEM Fountain Company equipment (or screen/curtain equipment that is developed specifically for a task or purchased from another manufacturer/distributor other than the PEM Fountain Company) such as a screen jet to convert pressurized supply water into an arc of water spray or mist. Other companies also provide water screen systems, such as Mirage WaterWorks, Inc., Anaheim, Calif., USA, and these company's systems and equipment may be used to provide a useful sprayed mist screen. While many screens/curtains are provided in a substantially vertical arrangement, the mist screens of the present description may be shot or provided from any angle such as, but not limited to, 40 to 80 degrees or the like in either direction.

A gravity-based or drop-style curtain may also be used to provide a thickness of fine water droplets to provide an RP screen. These systems typically involve a series of manifold or nozzle sections to provide a desired width of screen, and then water is pumped up to the location of the screen manifold (e.g., 5 to 30 feet is typical while much taller screens may be created with the free-falling water droplets such as 30 to 100 feet or more). For example, but not as a limitation, water screen systems available from Tsunami Water Screens, Oak Park, Ill., USA may be used to provide a free-falling water droplet screen useful for an RP screen, and these systems may provide a riser or manifold with 4-foot sections of elongated nozzles with 2-inch by 2-inch cross sectional shapes (so as to provide a screen or curtain between about 0.5 to 3 inches in thickness). In these systems, the water does not have to be under high pressure but simply has to be fed at adequate volumes through the nozzle section or distribution piping which include numerous small holes in a bottom nozzle/orifice surface to disperse the supply water as water drops or fine droplets (e.g., a water spray or mist) useful as a 3D projection surface.

Generally, nearly any type of projector may be used to project the 3D content onto the mist screen, but, since providing 3D displays typically reduces brightness of the projected images, higher brightness projectors may be more desirable in many applications of the 3D display system. For example, it may be useful to utilize a high brightness projector that has a brightness of at least about 7000 ANSI lumens while many implementations will use projectors (such as LCD-type or DLP-type projectors) providing 10000 to 15000 (or more) ANSI lumens. Such projectors are readily available from Christie Digital Systems USA and other manufacturers/distributors.

Figure 3:
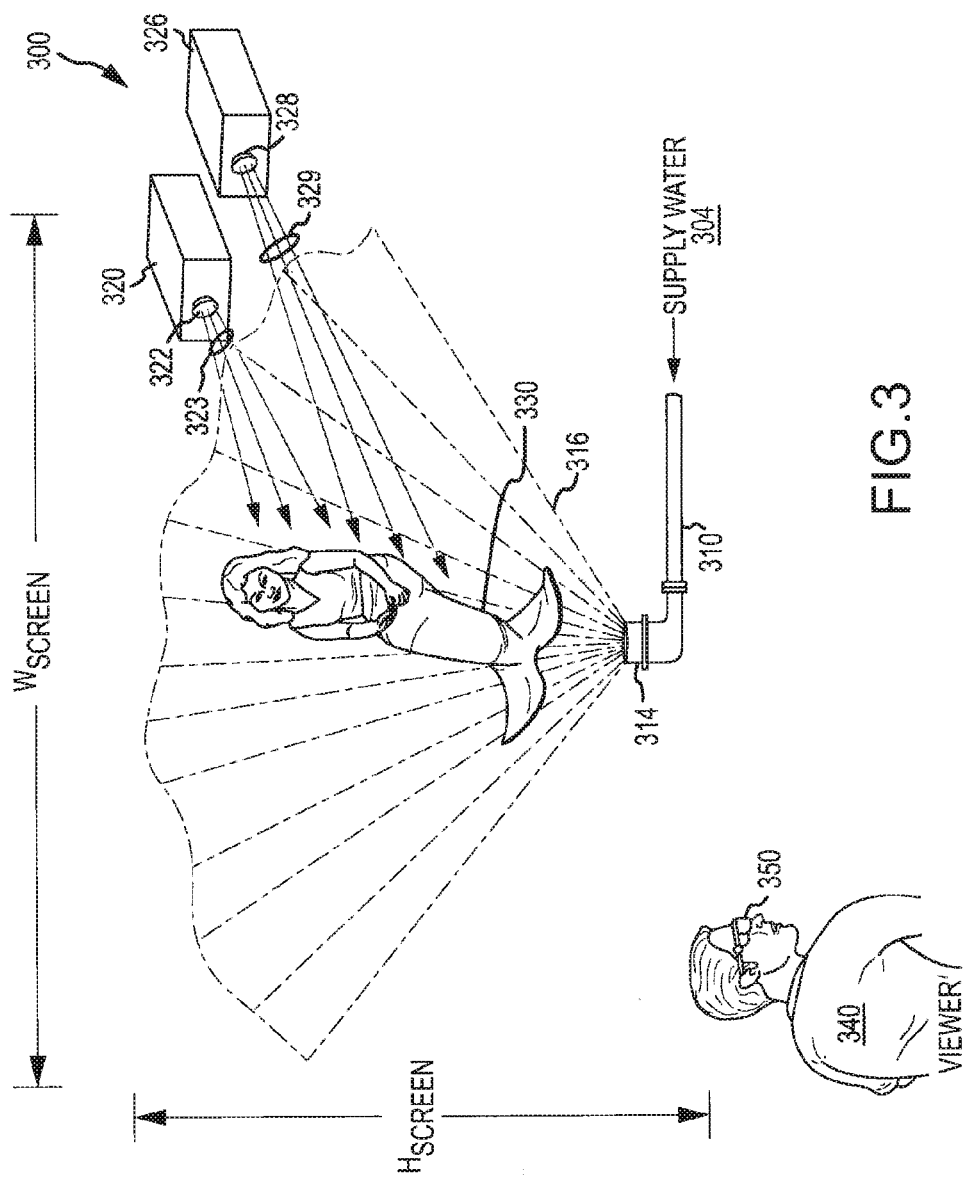
FIG. 3 illustrates an exemplary 3D display system utilizing a pair of projectors, 3D glasses, and a RP screen formed by a water screen jet or nozzle to display a 3D image to a viewer or audience.

FIG. 3 illustrates a 3D display system 300 during operation to provide or display a 3D image 330 to a viewer 340. The 3D display system 300 creates a mist RP screen 316 using a spray technique. Specifically, the 3D display system 300 includes a supply line 310 to provide pressurized water from a water supply 304 to a mist generating/spraying nozzle 314. For example, the nozzle 314 may take the form of a screen jet or similar device as described above that converts the high pressure (e.g., above 50 psi) water from supply 304 into a peacock tail-shaped screen 316 with fine droplets of water (e.g., a large percentage of droplets that are less than about 1000 microns in size).

The screen 316, though, is also generally planar at least near the nozzle/outlet orifice 314 so as to retain a desirable density of the droplets providing the projection surfaces (or lenses) for the 3D image 330. One reason light is reflected off of water-mist curtains has to do with the amount of air that is mixed with the water as it is ejected through fountain nozzle orifices. The water particulates are illuminated as light strikes them to provide a useful projection surface. The nozzle 314 and pressure of supply water 304 may be selected to provide a screen 316 with a desired height, $H_{Screen}$, and width, $W_{Screen}$ (such as at least about 10 feet in height by 30 feet in width), with the shape often being a fan or peacock-tail shape.

As shown, the display system 300 includes first and second projectors 320, 326 that are operated (such as by a video processor or media server) to project 3D content 323, 329 onto the rear surface of the mist screen 316. To this end, the projectors 320, 326 may be fed or receive as input left and right eye image streams, respectively, and includes a 3D adapter/filter 322, 328 to provide the content 323, 329. As discussed above, the 3D technology used may vary to practice the invention and system 300, and it is matched or paired with 3D glasses or filters 350 provided to viewers 340 of the 3D image 330 on RP screen 316. For example, the filters or adapters 322, 328 and filters in glasses 350 may include interference filters when the 3D technology or technique is wavelength multiplex visualization (e.g., the 3D technology may be that provided by Dolby and/or Infitec GmbH) while other cases may make use of linear or circular polarization or other 3D technologies.

The screen 316 may be formed prior to operating the projectors 320, 326, with the screen 316 being nearly invisible in certain low light settings, and then the projectors 320, 326 are operated to project 3D content (left and right eye images) onto a rear surface (or surface opposite the surface near the viewer 350) to provide a high quality 3D image 330 viewable by the viewer 340 through the filters of the lenses of 3D glasses. The flow rate and pressure of the supply water 304 may be held constant during projection 323, 329 of the 3D content or it may be varied to achieve a desired effect. For example, the 3D image 330 may be grown in size by increasing the water pressure to increase the height, and width, $W_{Screen}$, or vice versa.

FIG. 4A illustrates a side view of display system 400 similar to that of FIG. 3. In the display system 400, a pair of projectors 410 is configured with adapters/filters 412 to project 3D content 414. The content 414 typically will be left and right eye images from a 3D movie or the like, and the adapters/filters 412 may be interference filters, polarizing filters, or the like, and the viewer 434 wears matching filters 432 (e.g., 3D glasses with appropriate interference filters, polarizing lenses, or the like) to view the displayed 3D images 430.

The 3D display system 400 is a spray-type system. Specifically, the display system 400 includes a screen jet/nozzle 420 that is adapted to convert high pressure supply water into a substantially planar and vertical mist screen 424. The jet/nozzle 420 provides a screen 424 with a rear surface 426 near and/or facing the projectors 410 and a front surface 428 near or facing the viewer 434. The rear surface 426 provides the projection surface, with its many fine droplets of water, for receiving the projected 3D content 414 (e.g., both projectors 410 are focused onto a single area or portion of the surface 426). The screen 424 is generally planar with a thickness, $t_{Screen}$, as measured at or near the outlet of nozzle/orifice 420 that provides enough droplets at each location of the surface 426 to provide an adequate 3D display 430. For example, the screen thickness, $t_{Screen}$, may be 3 to 6 inches or more with some jet screens having diameters of about 12 inches (e.g., the thickness at the base likely would be about 10 to 12 inches in such cases).

One issue with screens 424 that are formed by spraying water upward is pollution or "noise" caused by the falling water 429. For example, the water 429 may fall down into the screen 424 causing some disruption of the surfaces and distorting or changing the image 430 viewed by the viewer 434. To reduce this issue, the nozzle/orifice 420 may be tilted one direction or the other relative to horizontal to cause the falling water 429 to fall in front or behind the mist screen 424. As shown, the nozzle 420 is tilted at an angle, $\theta$, such that the falling water 429 falls in front of the front surface 428 and does not affect the rear projection surface 426, e.g., the tilt angle, $\theta$, may be 1 to 5 degrees or more to achieve a particular effect or result.

FIG. 4B illustrates a 3D display system 450 that makes use of several of the components of the system 4100 of FIG. 4A such as projectors 410, adapters 414, and filters 432 (such as in 3D glasses). The system 450 differs from system 400, though, because it is a free-falling water system. To this end, the system 450 includes a curtain manifold or distribution piping 460 that provide numerous outlets/holes (or nozzle sections) through which water droplets are ejected or dispersed to fall to the ground due to gravity and provide a mist screen or curtain 462.

The free-falling mist or water screen 462 has a thickness, $t_{Screen}$, as measured at or near the manifold/piping 460, and this thickness, $t_{Screen}$, generally is relative constant along the entire height of the screen 462 (which is planar sheet of falling water drops). The water drops in mist screen 462 often are larger than those in sprayed screen 424 such that the thickness may be less such as 0.5 to 4 inches rather than 4 to 12 inches in screen 424 but still obtain a desirable 3D image 468. During use, the projectors 410 operate to project 3D content through the filters/adapters 412 onto the rear surface 464 of drop-style water curtain 462. As a result, a viewer 434 is able to perceive a 3D image 468 from front surface 466 through the filters 432 (which are paired in technology/design to the adapters/filters 412).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. In some embodiments, the projection assembly is configured such that dual projection is not required such as through the use of a rotating filter-type projector, and it should also be stressed that the display systems may use a variety of polarization technologies (existing or yet-to-be-developed) and the viewer may or may not need to wear 3D filters/glasses to view the 3D content projected upon the water RP screen.

We claim:

1. A 3D display system using water to provide a projection surface, comprising:
   a projection screen generation assembly comprising a nozzle converting a volume of supply water into a screen of water droplets, the screen having a front surface facing a viewing area and an opposite rear surface; and
   a projection assembly operating at least partially concurrently with the projection screen generation assembly to project 3D content onto the rear surface,
   wherein the projection assembly comprises a first projector projecting a stream of left eye images and a second projector projecting a stream of right eye images, the projected 3D content comprising the left and right eye images, and
   wherein the first projector includes a first interference filter and the second projector includes a second interference filter differing from the first interference filter, whereby the left and right eye images are presented concurrently on the rear surface with differing bands of the visible color spectrum.

2. The display system of claim 1, further comprising 3D glasses provided to viewers in the viewing area, each of the 3D glasses including a left lens comprising an interference filter configured to pass images filtered by the first interference filter and a right lens comprising an interference filter configure to pass images filtered by the second interference filter.

3. The display system of claim 1, wherein the first and second projector project the left and right eye images at brightness levels of at least about 10,000 lumens.

4. The display system of claim 1, wherein the nozzle comprises a screen jet positioned to spray the water droplets upward to form a substantially planar sheet of water that is substantially vertical.

5. The display system of claim 4, wherein the supply water is at a pressure of at least 50 psi and the planar sheet of water has a thickness of at least about 3 inches as measured at a base of the planar sheet proximate to the nozzle.

6. The display system of claim 4, wherein at least about 50 percent of the water droplets have outer dimensions of less than about 1 millimeter.

7. A 3D display system using water to provide a projection surface, comprising:
a projection screen generation assembly comprising a nozzle converting a volume of supply water into a screen of water droplets, the screen having a front surface facing a viewing area and an opposite rear surface; and
a projection assembly operating at least partially concurrently with the projection screen generation assembly to project 3D content onto the rear surface,
wherein the nozzle comprises an elongated distribution manifold positioned a height above the ground of at least about 10 feet, wherein the distribution manifold comprises a plurality of holes on a ground-facing surface to drop the water droplets toward the ground to form the screen, and wherein the screen has a thickness of at least about 1 inch as measured proximate to the ground-facing surface.

8. The display system of claim 7, wherein the projection assembly comprises a first projector projecting a stream of left eye images and a second projector projecting a stream of right eye images, the projected 3D content comprising the left and right eye images.

9. The display system of claim 8, wherein the first projector includes a first interference filter and the second projector includes a second interference filter differing from the first interference filter, whereby the left and right eye images are presented concurrently on the rear surface with differing bands of the visible color spectrum.

10. The display system of claim 9, further comprising 3D glasses provided to viewers in the viewing area, each of the 3D glasses including a left lens comprising an interference filter configured to pass images filtered by the first interference filter and a right lens comprising an interference filter configure to pass images filtered by the second interference filter.

11. The display system of claim 8, wherein the first and second projector project the left and right eye images at brightness levels of at least about 10,000 lumens.

12. The display system of claim 7, wherein the nozzle comprises a screen jet positioned to spray the water droplets upward to form a substantially planar sheet of water that is substantially vertical.

13. The display system of claim 12, wherein the supply water is at a pressure of at least 50 psi and the planar sheet of water has a thickness of at least about 3 inches as measured at a base of the planar sheet proximate to the nozzle.

14. The display system of claim 12, wherein at least about 50 percent of the water droplets have outer dimensions of less than about 1 millimeter.

15. A water-based projection apparatus, comprising:
a water supply selectively operable to provide a volume of water;
a mist generator receiving the volume of water and, in response, outputting a planar screen comprising mist;
a media server providing a stream of left and right eye images; and
a projection system processing the left and right eye images and, in response, projecting 3D content onto a surface of the mist screen,
wherein the mist generator comprises an elongated distribution manifold positioned a height above the ground of at least about 10 feet, wherein the distribution manifold comprises a plurality of holes on a ground-facing surface to drop the water droplets toward the ground to form the screen, and wherein the mist screen has a thickness of at least about 1 inch as measured proximate to the ground-facing surface.

16. The apparatus of claim 15, wherein the mist generator comprises an orifice outputting the mist screen within about 5 degrees of vertical.

17. The apparatus of claim 16, wherein the mist screen comprises fine droplets with at least about 50 percent being less than about 1 millimeter in outer diameter.

18. The apparatus of claim 15, wherein the projection system comprises a first projector projecting the left eye images and a second projector projecting the right eye images and wherein the first and second projectors each include a 3D technology adapter performing the processing to provide the 3D content.

19. The apparatus of claim 18, wherein the 3D technology adapters comprise a first interference filter and a second interference filter differing from the first interference filter, whereby a 3D image is viewable through 3D glasses comprising lenses corresponding to the first and second interference filters.

20. A 3D display system, comprising:
a mist generator receiving a volume of pressurized water and outputting a planar screen comprising a plurality of fine water droplets;
a first projector projecting a stream of left eye images for a 3D movie onto a rear surface of the water screen; and
a second projector concurrently projecting a stream of right eye images, corresponding to the left eye images, onto the rear surface of the water screen, wherein the first projector includes a first interference filter and the second projector includes a second interference filter differing from the first interference filter, whereby the left and right eye images are presented concurrently on the rear surface with differing bands of the visible color spectrum.

21. The system of claim 20, wherein the left and right eye images are separately viewable using lenses including interference filters.

22. The system of claim 20, wherein the mist generator comprises a screen jet and the pressurized water is at a pressure of at least about 50 psi.

23. The system of claim 22, wherein the screen jet has a plurality of openings sized to produce water droplets with outer dimensions less than about 1000 microns.

24. The apparatus of claim 20, wherein the first and second projectors each comprise a high-brightness projector providing the projected left and right eye images at a brightness of at least about 10000 lumens.

* * * * *